May 22, 1934. A. P. BARTUSCH 1,959,894
MOLDING APPARATUS
Filed April 13, 1931 5 Sheets-Sheet 1

INVENTOR
Alexander P. Bartusch
by Brown & Critchlow
his Attorneys

May 22, 1934.   A. P. BARTUSCH   1,959,894
MOLDING APPARATUS
Filed April 13, 1931   5 Sheets-Sheet 5

INVENTOR
Alexander P. Bartusch
by Brown & Critchlow
his Attorneys

Patented May 22, 1934

1,959,894

UNITED STATES PATENT OFFICE 1,959,894

MOLDING APPARATUS

Alexander P. Bartusch, Swissvale, Pa.

Application April 13, 1931, Serial No. 529,561

19 Claims. (Cl. 49—37)

This invention relates to an improved apparatus for making molded articles of plastic material, and although not necessarily so limited is intended more particularly for use in the manufacture of glassware.

The primary object of the invention generally stated is to provide apparatus of the nature referred to which is fully automatic and continuous in operation, and in which all of the molding operations are carried out without in any way interfering with the continuous movement of the molding elements thereby rendering it susceptible of being operated at relatively high speeds.

A further object is to provide molding apparatus of this character which is equipped with a sufficient number of plungers and molds to allow the plungers to be held in the molds while an article is being formed sufficiently long to mold it properly and to do so without necessitating any slowing down or stopping of the apparatus, and in addition to also allow the molds to be separated from the plungers and molding material sufficiently long between successive molding operations to allow them to cool properly, the ratio of the number of plungers and molds provided being such as to attain these objectives without the use of an excessive number of either plungers or molds.

A still further object is to provide molding apparatus having the aforementioned characteristics in which either one-part or multiple section molds and molds of different sizes and shapes may be used whereby rendering it susceptible of use for producing articles of various shapes and sizes.

Another object is to provide apparatus of this nature which is comparatively simple of construction, dependable and efficient in operation, and in addition is adapted to operate at high speeds, whereby both materially increasing the quantity of production and decreasing the cost thereof.

These and various other objects, as well as the various other novel features and advantages of the invention, will be apparent when the following detailed description is read in conjunction with the accompanying drawings, of which Figs. 7 and 8 are similar views of a sectional type mold; Fig. 9 is a plan view and Fig. 10 a side view of the lower half of the mold shown in Figs. 7 and 8; and Fig. 11 is a side view of one of the links of the mold supporting conveyor chain.

Referring now in detail to the embodiment of the invention illustrated in the drawings, the reference character 1 designates a base support upon which the machine proper is mounted. At the opposite ends of this base there are provided a pair of sprocket wheels 2 and 3 which are adapted to rotate in a horizontal plane and about them there is mounted a chain 4. This chain, as illustrated in the various figures, and more particularly in Fig. 11, comprises a plurality of clevis shaped links 5. These links each have a closed end in which there is formed a mold-receiving opening 6, and a pair of arms 7 and 8 in each of which there are provided eyes 9 and 11. In assembling the chain the eyes 9 and 11 are fitted over the mold-receiving end of the next adjacent link, and the links then bound together by a bushing 12 which is passed through opening 6 and crimped at its two ends. The teeth 13 of the two sprocket wheel 2 and 3 are so formed that they engage the closed end of each of the links.

Above sprocket wheel 2 there is mounted a rotatable turret 15, in which there is formed a plurality of openings 16 adapted for the reception of a plurality of detachable plungers 17, the openings being so arranged as to place the plungers carried therein in direct alignment with the molds 14 supported in the links of the conveyor chain extending below the turret. In operation the plungers are moved into and out of the molds as they pass under the turret, and to provide sufficient spacing between the conveyor and turret for such operations the turret is provided with an elongate hub 18, which is rigidly attached at its lower end to the top of sprocket wheel 2 by means of bolts 19, but may be adapted for adjustment to take care of wear in the sprocket teeth or chain.

Below sprocket 2 there is provided a hub member 21 for spacing it from the base of the machine. Through this hub, the sprocket 2 and turret 15 a shaft 22 is extended, the lower end of the shaft being anchored in an opening 23 in base 1 and its upper end in an opening 24 formed in a diamond shaped frame member 25 supported at the top of the apparatus. To prevent shaft 22 from rotating, it is locked by a key 26 in hub 21.

Above the turret 15 there is mounted a cam plate 27 for lifting the plungers 17 from the molds 14 as will appear more clearly hereinafter. This plate is formed in the shape of a disk having a hub 28 in its center through which shaft 22 extends, and a key 29 holds it against rotation.

Like sprocket 2 sprocket 3 is mounted upon a shaft 35, the lower end of which is fitted tightly in a hub 36. To eliminate friction in both these sprockets and turret 15 they are provided with antifriction bearings 31, the one in the upper part of the hub of sprocket 2 being held in place by a nut 34 threaded upon shaft 22, and the one in the upper part of the hub of sprocket 3 by a ring member 41 and a nut 37.

Figure 1:
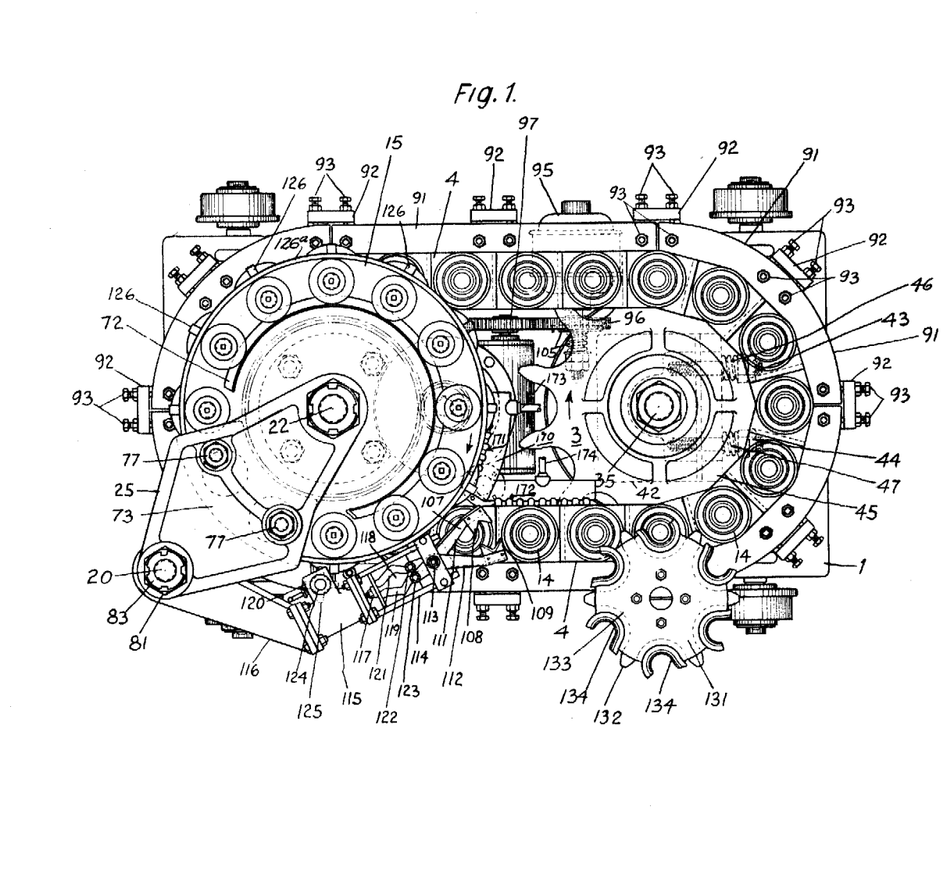
Fig. 1 is a plan view, Fig. 2 a side view, and Figs. 3 and 4 end views respectively of a molding machine constructed in accordance with the invention.
Figure 3:
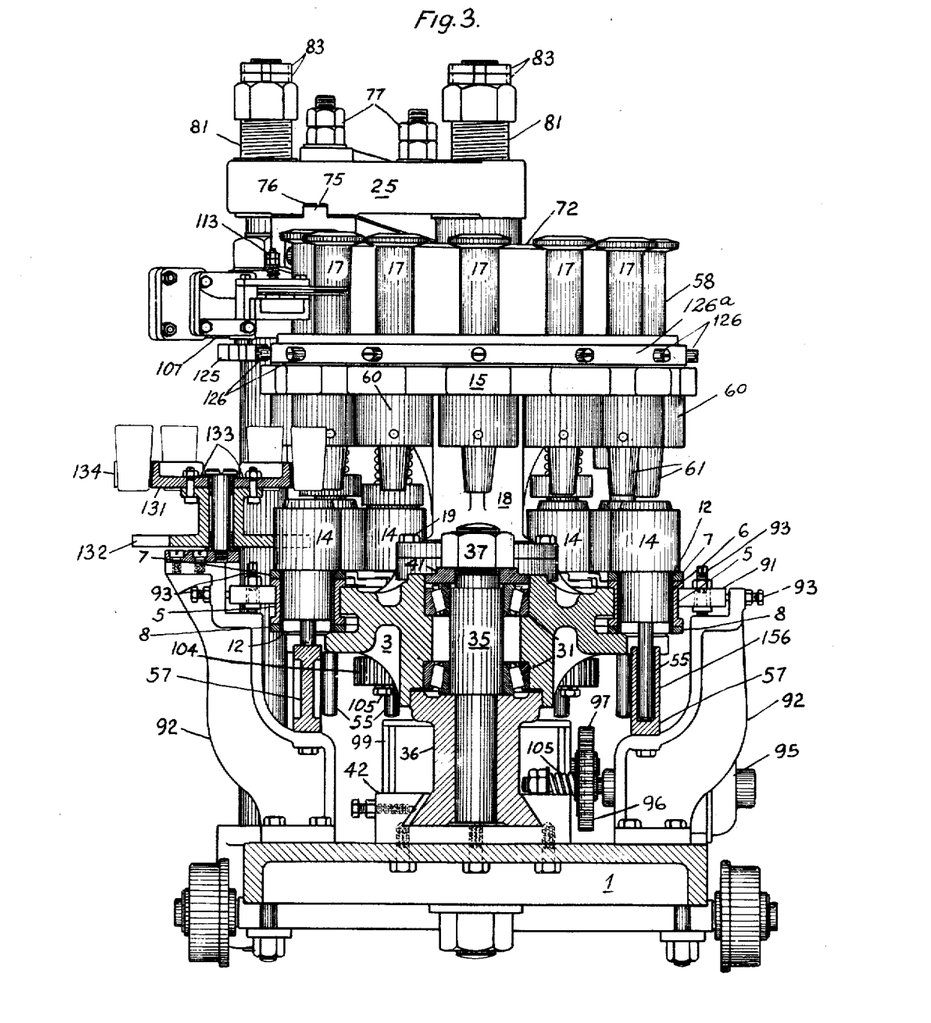
Figure 4:
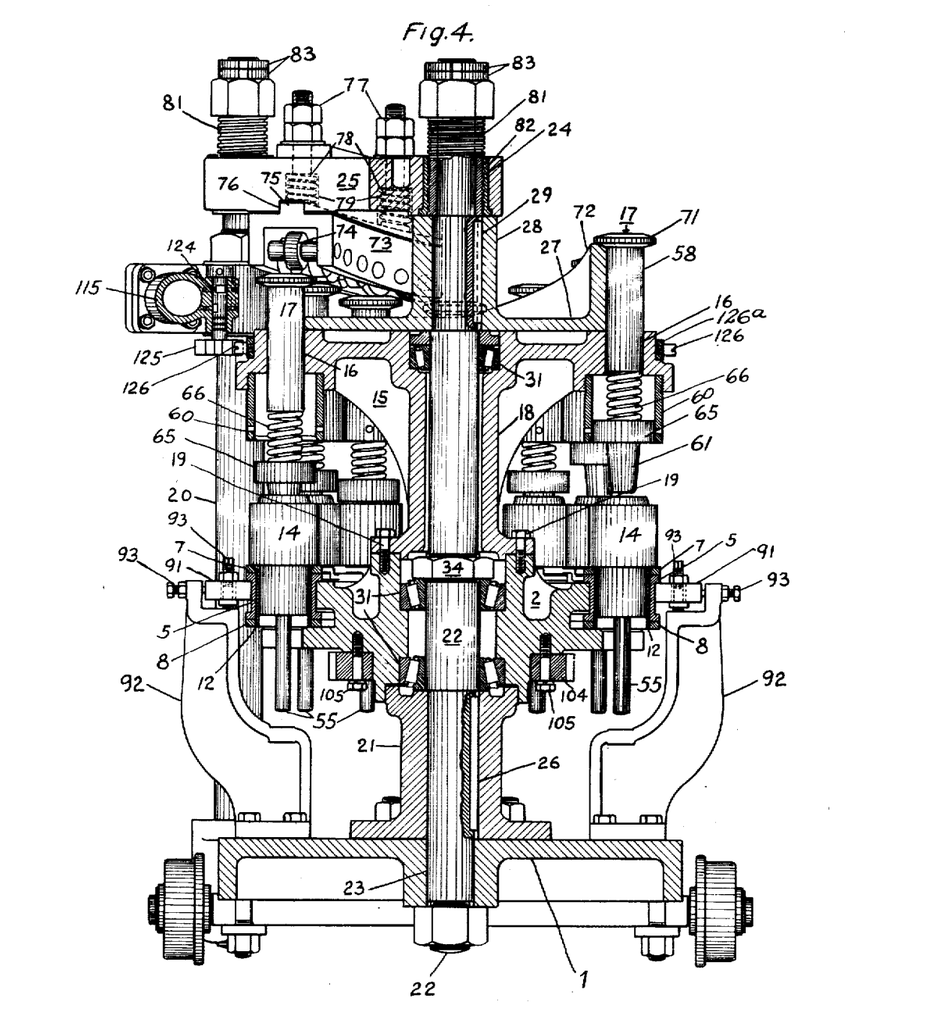

In order to take up any slack which may tend to occur in conveyor 4, hub 36, on which sprocket 3 is supported, is adjustably mounted in a base support 42 which as shown more particularly in Figs. 1 and 3, is adapted to permit the hub being moved lengthwise of the machine. For taking the slack up automatically, and for also holding hub 36 in operative position, it is secured to a rigid bracket 45 by a pair of bolts 43 and 44 upon the outer end of which a pair of helical springs 46 and 47 are arranged to constantly urge the hub 36 toward the end of base 1.

Figures 5, 6:
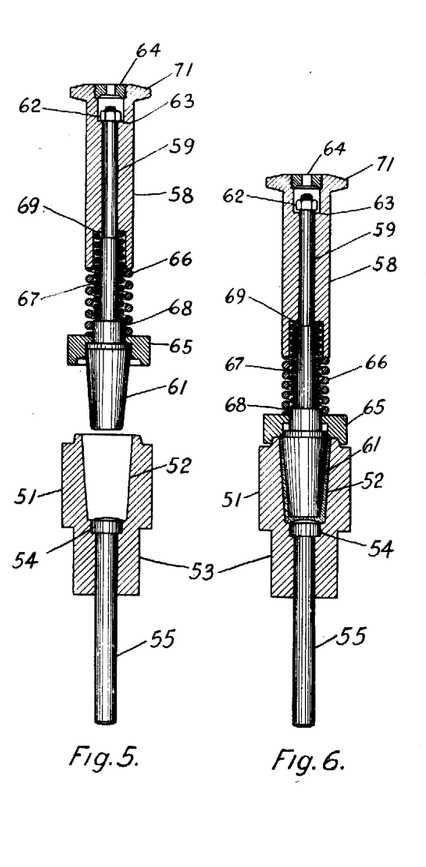
Figs. 5 and 6 are views of a one-part mold and cooperating plunger showing the plunger respectively in its inoperative and molding positions.

As referred to above molds 14 and plungers 17 are detachably mounted in conveyor 4 and turret 15, respectively. This makes it possible to use different size and shape mold assemblies and accordingly to make different sized and shaped articles in the apparatus. In Figs. 5, 6, 7, 8, 9 and 10 there are illustrated two different types of mold assemblies designed for such use. The mold assembly shown in Figs. 5 and 6 is what is known in the art as a single part mold and that shown in Figs. 7, 8, 9 and 10 an open and shut or multiple section mold and both are adapted for use in the apparatus as illustrated.

Figures 2, 11:
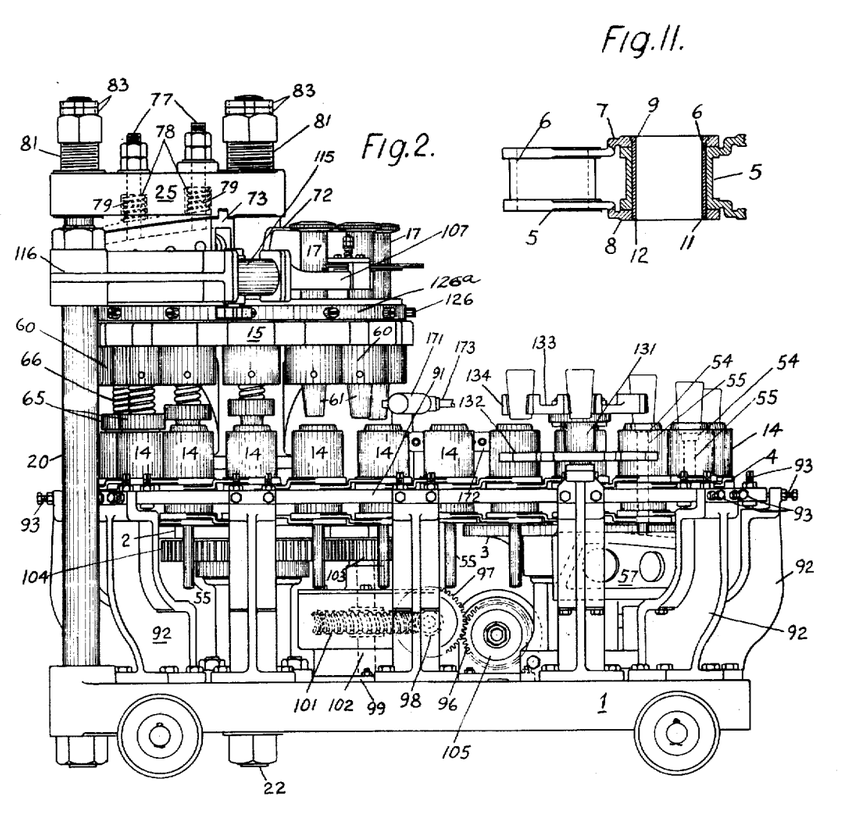

Referring to the assembly shown in Figs. 5 and 6 the female part, hereinbefore referred to as the mold is illustrated as comprising a mold block 51 in which an opening 52 conforming in shape to the exterior of the article to be molded is formed. The lower part 53 of this block is shaped to fit snugly in the openings 6 in conveyor 4 while within the block there is fitted a lifting rod 55 carrying at its upper end an enlarged portion or plunger 54 which functions both as a bottom for the mold and means for lifting the finished article from the mold and which is shown here as a tumbler 50. The rod 55 extends below the bottom of the block 51 and also the conveyor, and as illustrated more particularly in Figs. 2 and 3 is adapted to engage a cam 57 located below the mold conveyor at the discharge end of the apparatus, the cam being so shaped as to gradually lift rod 55 and plunger 54 as the mold is moved thereover and consequently any article disposed in the mold.

The plunger as shown in Figs. 5, 6, 7 and 8 comprises a sleeve 58 which is adapted to fit in the openings 16 of turret 15. Within this sleeve there is arranged for reciprocatory movement a plunger rod 59 carrying at its lower end a male mold element 61 and at its upper end a nut 62. The latter end of rod 59 is limited in its downward movement by the lower end of an enlarged opening 63 against which nut 62 contacts. An exteriorly threaded plug 64 is screwed in the upper end of opening 63. For preventing the escape of material from the female mold, and for also forming an edge on the upper end of the article being molded, a cover member 65 is fitted loosely on rod 59 on the top of mold element 61. To allow this sealing or cover member to recede as element 61 is moved into the female mold, rod 59 is extended below the end of sleeve 58 and a helical spring 66 is fitted between the lower end of the sleeve and the top of ring 65.

Another feature of the plunger resides in the use of second spring 67 which is mounted on rod 59 with its lower end bearing against a shoulder 68 at the top of the male mold and its upper end against the upper end of an enlarged opening 69 formed in the lower end of sleeve 58. The purpose of this latter spring is to provide a sufficient amount of resiliency in the male mold to insure the molding material being forced to the top of the mold when the plunger is moved into opening 52. It also provides against injury to the mold assembly in case foreign objects or too much molding material is admitted to the mold.

In operation, when sleeve 58 is forced downwardly, as it is, cover member 65 engages the upper end of mold 51 before mold 61 is moved its full distance into mold opening 52, the continued movement of the sleeve thereafter be ng permitted by the flexing of spring 66. As soon as mold 61 is moved into the mold 51 sufficiently to force the molding material to the top of opening 52, its further downward movement is prevented by reason of the cover member 65 sealing the top of the mold. However, sleeve 58 is permitted to move a limited amount beyond the point where mold 61 stops it through the flexing of spring 67 which is made sufficiently strong to function in this manner. By reason of such provision the only effect an excessive amount of molding material in the mold has is that of increasing the thickness of the article being molded and in case a foreign object gets into the mold injury to the mold and assembly is prevented.

Referring now to Figs. 7, 8, 9 and 10, the open and shut type of mold assembly illustrated therein comprise a mold carrier 141 having a cup-like opening in its upper end in which a pair of expansible mold sections 142 and 143 are arranged. These mold sections are normally urged into engagement with each other by springs 144 which are arranged between the mold sections and the walls of the mold carrier, and to guide the molds in their opening and closing movement a pair of pins 145 are screwed into each section, these pins being arranged to move in holes 146 cut in the sides of the mold carrier. Like the one-part mold previously described, the lower part 140 of the carrier is adapted to fit in the opening 6 in conveyor 4 and a plunger 147 mounted on the upper end of a lifting rod 148 is arranged to form the bottom of the mold opening in section 142 and 143. This plunger is prevented from falling below its bottom-forming position by a pair of pins 149 which are extended through the mold carrier.

Figures 7, 8, 9, 10:
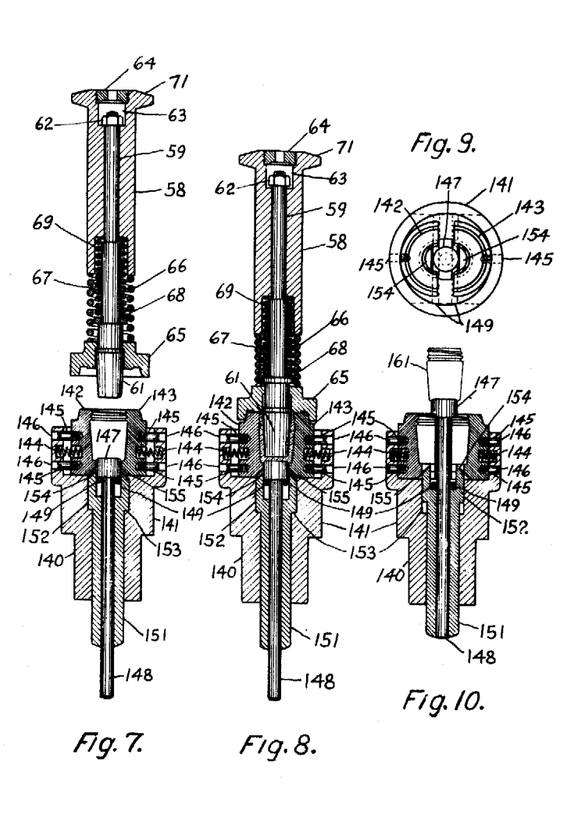

For separating the molds so that an article formed in them may be removed, a hollow separating rod 151 is provided. This rod has an enlarged portion 152 which seats in a correspondingly enlarged opening 153 in the mold carrier, and its upper end is formed with tapered walls 154 which engage corresponding walls 155 formed in the bottom of the mold sections. For operating this latter type of mold, lifting cam 57 has projections 156 formed along its opposite sides for engaging the lower end of the mold separating rod 151 before the cam proper engages the lifting rod 148. Consequently as the mold is carried over the cam it first engages the lower end of rod 151, forcing it upwardly sufficiently to separate the mold sections 142 and 143, then engages the lifting rod 148 forcing plunger 147 upwardly, and lifting the finished article 161 from the mold, as shown in Fig. 10. After leaving cam 57 the lifting rods of both forms of molds are adapted to fall due to gravity to their normal lower positions, the cam being so shaped as to prevent the separating rod in the case of the multiple section mold from dropping before the lifting rod.

For use in raising the plunger out of the molds and forcing it downwardly thereinto, a head 71 which is tapered on its upper and lower sides is formed on the upper end of sleeve 58. This lifting of the plunger is effected by an upright cam 72 which is extended about the greater portion of the periphery of the cam plate 27, the cam being so shaped as to engage the under side of head 71 and lift sleeve 58 sufficiently to allow plunger 61 to clear mold 14 before the mold passes from under turret 15 and to hold the plunger in this lifted position until it registers with another mold on the opposite side of the turret. The forcing of the plunger downward is effected by an overhead cam 73 which is secured to the under side of frame member 25 over the back central portion of sprocket 2 where conveyor 4 is in constant contact with the sprocket. This latter cam engages the upper side of sleeve heads 71 as they pass thereunder and to eliminate friction is equipped with rollers 74. For holding it in place it is provided with a tongue 75 on its upper side which fits in a groove 76 formed in frame section 25. In addition it is secured to the frame by a pair of bolts 77, about which there are mounted in openings 78 cut in frame 25 a pair of springs 79 that give to the cam mounting a limited amount of resiliency and whereby injury and wear due to engagement between the cam and plungers are reduced.

To provide for raising and lowering cam 73 to vary the stroke of the plungers 17, or to adapt it for use with different sizes and forms of plungers and mold assemblies, threaded bushings 81 are mounted upon shafts 22 and 20 and engaged in interiorly threaded bushings 82 fitted tightly in the openings in the frame member 25 through which these shafts extend. Hence frame 25 and cam 73 may be raised or lowered by merely turning the threaded bushings 81, these bushings being adapted to bear against nuts 83 secured on the upper ends of shafts 22 and 20. To simplify such adjustment and insure even movement of frame 25, a suitable tool may be employed to turn the two bushings simultaneously.

For maintaining conveyor chain 4 in accurate alignment and the molds carried thereby in a correct upright position as they pass about the machine, and particularly as they pass under the turret, a guide rail 91 support by brackets 92 attached at spaced intervals to base 1 is extended about the periphery of the machine. This rail is held in place by horizontally and vertically disposed adjusting set screws 93 and through the agency of which the guide rail may be adjusted at the will of the operator. As a guide for the rings 65 on plungers 17, a cylindrical casing 60 is mounted in the lower end of openings 16 in turret 15. These act both as guide members for these rings and means for maintaining the plunger unit as a whole in alignment.

For increasing or decreasing the temperature of the molds and plunger so as to obtain the most satisfactory results when operating on materials requiring different temperatures in the mold units than those afforded by normal operation, a heat regulating fluid projector 170 is provided. This is suitably mounted on the frame of the apparatus adjacent where the conveyor passes under turret 15 with one section 171 arranged to extend about a portion of the turret opposite the path of travel of the plungers and another section 172 arranged to extend along the inner side of the path of travel of the molds. In its preferred form projector 170 is adapted for use either with a heating or cooling fluid and in order that either may be supplied to the two sections separately separate supply connections 173 and 174 are provided.

Power for operating the machine is provided by a single motor 95 which is conveniently secured, as shown, to base 1. On the drive shaft of this motor there is mounted a driving gear 96, which is arranged to mesh with another gear 97, which is in turn secured to a shaft carrying a worm pinion 98 disposed in a housing 99 below sprocket 2. This worm pinion meshes with a worm gear 101 which is mounted upon a vertically disposed shaft 102 that carries a horizontally disposed gear 103 at its upper end. This latter gear in turn meshes with a ring gear 104 mounted on the lower end of the hub of sprocket 2 by means of bolts 105. To prevent injury to the apparatus due to jamming or stopping thereof for any reason while the motor is energized, gear 96 is secured to the shaft of the motor through a friction clutch 105, of a well konwn form of construction.

For determining the amount of molding material supplied to the molds, a pair of shears 107 are arranged adjacent the point where the molds pass under turret 15 and are adapted to sever a given amount of material from a continuously fed supply as each mold passes under them. These shears consist of a pair of blades 108 and 109 which are mounted upon a pair of levers 11 and 112, respectively, the latter being pivoted about a bolt 113 secured in a rigid frame 114. For actuating the shears a fluid pressure operated cylinder 115 is provided, being mounted upon a bracket 116 attached to shaft 20. Within cylinder 115 there is arranged a piston which is attached by a piston rod 117 to a cam block 118 arranged for reciprocatory movement in a frame 114 which is in turn secured to cylinder 115 and bracket 116. In said cam block there are provided a pair of angular grooves 119 and 121 and in them a pair of vertically disposed pins 122 and 123 mounted upon the tail ends of levers 111 and 112 are arranged to move, the grooves being so shaped as to both close and open the shears each time the cam block is moved forward or backward.

For controlling the operation of the shears, a suitable source of fluid supply is connected by a conduit 120 with cylinder 115 and in this conduit a rotary valve 124 is arranged. For synchronizing the operation of this valve with the movement of the molds, it is provided with an operating cam 127 equipped with arms 125 which are adapted to be engaged by pins 126 mounted in spaced relation about the periphery of turret 15 in a ring 126ª adjustably secured to the periphery of the turret by the pins or other suitable means. These pins as shown are so spaced that the shears will be caused to operate at the proper instant with respect to the position of the molds so that the molding material severed by them will drop into the molds as they move thereunder and the ring 126ª is adjustably mounted to insure the proper timing thereof.

For removing the articles produced in the molds from the apparatus after the molding operation has been completed and the article lifted from the molds through the conjoint action of the lifting rods 55 and the cam 57 a discharge mechanism 131 is provided. This consists of a sprocket 132 mounted upon one of the supports 92 located on the side of the machine just forward of shears 107. This sprocket is arranged to be rotated by the molds mounted in the conveyor as they pass by it, and on its upper end there is secured a disk 133. About the edges of this disk there are provided a plurality of pockets 134, which, in the embodiment shown, are tapered downwardly as illustrated more particularly in Fig. 3 and are disposed on an angle to a line passed through the center of the disk, being so formed and the sprocket wheel drive so synchronized with the molds that they pick the molded article from the lifting plungers as they move over the conveyor. For removing the articles from pockets 134, a suitable conveyor (not shown), such as a belt or other similar device, may be arranged to move under disk 133 and carry the molded articles out of the pockets as the disk moves thereover.

In operating the machine motor 95 is first set in motion and then the molten glass, or whatever material is to be molded, is fed in a continuous stream to shears 107. As the pins 126 come in contact with the arms of valve 124 the shears are operated, the flow of material being so regulated as to cause the proper amount to be severed therefrom to form an article each time they are actuated. Immediately after the severed piece of material falls into a mold, the latter moves under turret 15 and as it passes the end of cam 72 one of the plungers 17 drops into the mold. The whole mold assembly then passes under the molding cam 73 and the plunger is forced into the mold. As soon as the plunger passes from under cam 73 it moves once more into engagement with the lifting end of cam 72 and is lifted free of the mold. This lifting operation is completed sufficiently before the mold is moved from under the plunger-supporting turret to avoid any fouling of the plunger and mold. From then on the molded article is allowed to set in the mold until it reaches the point where the lifting rod of the molds engages the front end of cam 57, where the molded article is lifted from the mold. After being freed of the mold, the mold is passed under the discharging disk 133 where the finished article is picked up by the pockets 134, and carried away from the apparatus to a suitable run out conveyor, not shown, which may be arranged at the side of the apparatus.

If it is desired to operate the apparatus at less than full capacity this may be done by either reducing the speed of motor 95 or by removing any desired number of molds 14 from conveyor 4, the removal thereof of course being made in regular spaced order. The number of plunger openings in the supporting turret for this purpose are made a multiple of the mold openings in the conveyor whereby permitting operation of the machine with a less number of mold units than the full complement of both plungers and molds. The advantage of this is most pronounced when the apparatus is used on small orders where it is uneconomical to provide a full complement of mold units. To adjust the shears for such reduced operation the number of pins 126 must be removed to insure the molding material being properly severed as the molds used pass under the shears which may be done by removing all those pins not needed in connection with the molds used. The supply of molding material must be correspondingly adjusted under such conditions of operation.

An advantage of the invention which will be readily appreciated by those skilled in the art of making glassware is that afforded by the provision in the apparatus of a greater number of molds than plungers, the ratio of the two being such as to afford proper cooling of both between successive molding operation without an excess of either. Through such provision as is obvious the molds are allowed to cool considerably longer than the plungers, a feature which is highly desirable, as the molds usually comprise considerably more mass than the plungers and are in contact with the molding material much longer, consequently they absorb more heat and require a greater length of time to cool. It is essential as is well known that they both be cooled sufficiently between molding successive operations to effect proper molding.

As will also be appreciated by reason of the novel construction of the apparatus as illustrated great flexibility as well as dependable and highly efficient operation is afforded. Furthermore, it provides for not only greater speed of production but also materially reduces the production costs.

According to the provisions of the patent statutes, I have explained the principle and mode of operation of my invention, and have illustrated and described what I now consider to be its best embodiment. However, I desire to have it understood that, within the scope of the appended claims, the invention may be practiced otherwise than as specifically illustrated and described.

I claim:

1. Apparatus for molding plastic materials comprising a continuously moving rigid turret shaped plunger support arranged for rotation in a horizontal plane, a plurality of plungers mounted about the circumference of said support, an endless conveyor mounted for continuous movement in a horizontal plane below said support and with a portion of it extending thereunder, a rigid annular support for said conveyor having an effective diameter equal to the diameter of said plunger support mounted for rotation concentrically therewith, a plurality of molds mounted in said conveyor, the number of molds provided being in excess of the number of plungers, and means for moving the plungers into and out of the molds as the latter are moved on said conveyor support under the plunger support.

2. Apparatus for molding plastic materials comprising a pair of spaced sprocket wheels mounted for rotation in a horizontal plane, a chain conveyor mounted upon said sprocket wheels, a plurality of molds carried by said conveyor, a turret having an effective diameter equal to the effective diameter of one of said sprocket wheels disposed concentrically thereabove and connected to be actuated in synchronism therewith, a plurality of plungers carried by said turret, means for continuously rotating said sprocket wheels, conveyor and turret, and means for moving said plungers into and out of the molds carried by said conveyor as they are carried about the sprocket wheel disposed below said turret.

3. Apparatus for molding plastic materials comprising an endless flexible conveyor arranged for movement in a horizontal plane, a plunger supporting turret arranged for rotation in a plane above said conveyor, a rigid annular shaped support having an effective diameter equal to the effective diameter of said turret and mounted concentrically therebelow and adapted to engage a portion of said conveyor, a common drive shaft operably coupled to said turret and conveyor support for actuating the turret and conveyor in synchronism, a plurality of molds carried by said conveyor, a lesser number of plungers carried by said support, means for imparting continuous movement to said drive shaft, and means for automatically moving the plungers carried by said turret into and out of the molds carried by said conveyor as the latter moves under the turret.

4. Apparatus for molding plastic materials comprising an endless flexible conveyor arranged for movement in a horizontal plane on and about a pair of horizontally aligned supporting sprocket wheels, a plunger-supporting turret having an effective diameter the same as the effective diameter of one of said sprocket wheels and concentrically mounted thereabove for rotation therewith, common means for continuously driving said turret, sprocket wheels, and conveyor in synchronism with one another, a plurality of molds mounted on said conveyor, a plurality of plungers carried by said turret, means for moving said plungers into and out of the molds mounted on said conveyor as the latter are passed under said turret, and means secured to said turret for determining the timing of molding material supplied to each mold.

5. Apparatus for molding plastic materials, comprising a pair of spaced sprocket wheels arranged for rotation in a horizontal plane, a flexible conveyor mounted upon said wheels, a plurality of molds mounted in said conveyor, a turret having an effective diameter equal to the effective diameter of one of said wheels and mounted concentrically thereabove for rotation in a plane parallel with the plane of said conveyor, common means for imparting continuous movement to said turret, sprocket wheels and conveyor, a plurality of molds carried by said conveyor, a plurality of plungers carried by said turret, means for moving the sprocket wheel spaced from the one located beneath the turret to take up any play which may develop in said conveyor, means for adjusting said turret relative to said conveyor wheel located therebelow, and cams for moving said plungers into and out of said molds as the conveyor moves under the turret.

6. Apparatus for molding plastic materials comprising an endless flexible conveyor arranged for movement in a horizontal plane, a pair of horizontally spaced sprocket wheels for supporting and moving said conveyor, a rigid plunger-supporting turret mounted for rotation concentrically above one of said sprocket wheels, means for continuously driving said turret, sprocket wheels and conveyor in synchronism with one another, a plurality of molds mounted on said conveyor, a plurality of plungers carried by said turret, means for moving said plungers into and out of the molds mounted on said conveyor as the latter are passed under said turret, means actuated in synchronism with said turret and conveyor for determining the timing of molding material supplied to each mold, and means spaced between the discharge side of said turret and the sprocket wheel horizontally spaced therefrom for lifting articles molded in the machine out of the molds after the molding operations are completed.

7. Apparatus for molding plastic materials, comprising a plunger-supporting turret arranged for rotation in a horizontal plane, a conveyor and mold supporting sprocket wheel mounted concentrically below said turret for rotation therewith, a common drive shaft operably connected to said turret and wheel, means operating through a friction clutch for continuously driving said shaft, a second conveyor supporting sprocket wheel spaced horizontally from said first-mentioned wheel, an endless conveyor mounted for movement in a horizontal plane about two sprocket wheels, a plurality of molds supported by said first-mentioned sprocket wheel carried by said conveyor, a plurality of plungers carried by said turret, and cams for moving said plungers into and out of said molds as the molds are moved under the turret without interrupting the movement of either the turret or conveyor.

8. Apparatus for molding plastic materials, comprising a single rigid plunger supporting turret arranged for rotation in a horizontal plane, an endless mold supporting conveyor mounted for movement under said turret and in a plane parallel therewith, a pair of rigid sprocket wheels for supporting said conveyor, one of said wheels being disposed below and concentric with said turret, and means for automatically adjusting the other of said sprocket wheels for taking up the slack in said conveyor.

9. Apparatus for molding plastic materials comprising a base member, a pair of sprocket wheels mounted for rotation in a horizontal plane above said base, a chain conveyor mounted upon said sprockets, a plurality of molds mounted on said conveyor, a turret secured to and arranged for concentric rotation above one of said sprocket wheels, a plurality of plungers adjustably mounted in said turret, a stationary cam mounted above said turret and arranged to engage the ends of said plungers for a portion of a revolution of the turret and force them into the molds carried on the conveyor as the latter passes thereunder, and a second stationary cam also mounted above said turret, said latter cam being adapted to engage the ends of said plungers after they have moved out of engagement with the first-mentioned cam and lift them free from the molds and so hold them during the remainder of the revolution of the turret.

10. Apparatus for molding plastic materials comprising a base member, a pair of sprocket wheels mounted for rotation in a horizontal plane above said member, a mold-supporting chain conveyor mounted upon said sprocket, a plurality of molds mounted vertically in spaced relation in said conveyor, and a guide member adjustably mounted about the periphery of said conveyor for maintaining said molds in proper alignment in their travel about said sprockets.

11. Apparatus for molding plastic materials comprising a flexible endless conveyor mounted for movement about a pair of spaced sprocket wheels disposed to rotate in a horizontal plane, a plurality of molds mounted on said conveyor, a turret disposed in concentric relation with one of said sprocket wheels and arranged to operate in synchronism with said conveyor, a plurality of plungers carried by said turret and arranged for movement into and out of the molds carried by said conveyor as they pass under the turret, a pair of cutting blades arranged immediately in front of the point where the conveyor passes under the turret for severing sections of molding material fed to the molds as the molds pass under the plungers, and means operated by the turret for synchronizing the operation of said shears with the movement of the molds carried on the conveyor.

12. Apparatus for molding plastic materials comprising a flexible mold conveyor having a plurality of molds mounted thereon, a pair of spaced sprocket wheels for supporting said conveyor arranged to rotate in a horizontal plane, a plunger supporting turret carrying a plurality of plungers arranged for rotation concentrically above one of said sprocket wheels, means for driving said turret and conveyor in synchronism and a cutting mechanism for severing from a continuous supply of molding material the amount required in each mold, said cutting mechanism being arranged in alignment with said conveyor at a point just preceding that where the conveyor passes under the turret and consisting of a pair of cutting blades mounted upon a pair of pivotally supported shear levers, a reciprocating cam block having a pair of angular grooves therein, a pair of pins mounted in the tail end of said shear levers for movement in said cam grooves, the latter being shaped to close and open the shear levers each time the cam block is moved a full stroke either forward or backward, means for reciprocating said block, and means operated by said turret for controlling said cam block reciprocating means.

13. Apparatus for molding plastic materials, comprising a looped conveyor arranged for continuous movement in a horizontal plane, a pair of horizontally aligned sprocket wheels for supporting said conveyor, a plurality of molds mounted in said conveyors, a turret concentrically disposed above one of said sprocket wheels, a plurality of plungers mounted in said turret for movement into and out of said molds as they are moved under the turret, lifting mechanism in said molds for lifting molded articles out of them, a cam so disposed below said conveyor as to operate said lifting mechanism between the time the molds pass out from under said turret and the time when they are repassed thereunder, a discharge mechanism mounted adjacent to said conveyor and arranged to be moved thereby, said latter mechanism including means for picking molded articles lifted from said molds by said lifting mechanism and carrying them out of the path of the conveyor.

14. Apparatus for molding plastic materials comprising a multiple section mold consisting of a mold carrier having a plurality of radially movable mold sections forming a female mold mounted in an opening in the upper end thereof, means urging said mold sections toward their molding position, a hollow separating rod having a wedge-shaped upper end disposed in an opening extending through the bottom of said carrier and adapted when raised to move said mold sections apart, and a lifting plunger mounted on a rod extended through said separating rod, said lifting plunger forming the bottom of said female mold when in its lowered position.

15. Apparatus for molding plastic materials comprising a multiple section mold consisting of a mold carrier, a plurality of mold sections mounted in an opening in the upper end of said carrier to form a male mold, resilient means disposed between the exterior of said mold sections and the interior of said carrier opening for urging the mold sections to their closed position, guide elements for guiding said sections in their opening and closing movements, a hollow separating rod mounted in said carrier below the mold sections for opening said sections, said rod being tapered at its upper end and arranged to engage the bottoms of said mold sections and force them apart when raised, a plunger arranged to form the bottom of the mold and mounted on the end of a lifting rod extended downwardly through said mold separating rod.

16. A molding apparatus comprising a conveyor arranged for continuous movement in a horizontal plane, a plurality of multiple section molds mounted in said conveyor each consisting of a mold carrier having a plurality of expansible mold sections arranged to form a female mold mounted in an opening in the upper end thereof, means on the exterior of said section normally urging them toward their closed position, a hollow mold separating rod having a wedge shaped upper end mounted for reciprocatory movement in an opening extending through the bottom of said carrier and adapted when raised to move said mold sections apart, and a lifting plunger mounted on the upper end of a lifting rod extended downwardly through said separating rod, said lifting plunger forming the bottom of said mold when in its lowered position, and a cam arranged below the path of travel of said conveyor for operating said separating and lifting rods, said cam being adapted to first raise said separating rod and then said lifting rods as the mold carrier is moved thereover by the conveyor.

17. Apparatus for molding plastic materials comprising an endless mold supporting conveyor arranged for movement in a horizontal plane, a pair of spaced sprocket wheels for supporting said conveyor, a rigid turret-shaped plunger support mounted concentrically above one of said sprocket wheels for movement in a horizontal plane over a portion of said conveyor, a plurality of molds detachably mounted in said conveyor and a plurality of plungers detachably mounted in said plunger support for movement into and out of said molds, the full complement of molds in said conveyor being of greater number than the number of plungers in said turret, and said support and conveyor being so constructed as to operate uniformly with less than their full complement of both plungers and molds.

18. Apparatus for molding plastic materials comprising a supporting base, a pair of sprocket wheels mounted in said base for rotation in a horizontal plane, a chain conveyor mounted upon and around said sprocket wheels, a plurality of molds mounted in said conveyor, a turret concentrically mounted above one of said sprocket wheels and adjustably coupled thereto, a plurality of mold plungers mounted in said turret for movement into and out of the molds in said conveyor as the conveyor is passed under the turret, means for circumferentially adjusting the turret with respect to the sprocket wheel disposed therebelow for compensating for wear in the sprocket wheel and conveyor, means for imparting continuous movement to said turret, sprocket wheels, and conveyor, a roller-faced cam disposed above said turret for moving said plungers into said molds as said turret is rotated, and a second cam for moving said plungers out of said molds as the latter are moved by the conveyor from under the turret.

19. Apparatus for molding plastic materials comprising a rigid annular conveyor support and an endless conveyor mounted around said support with a portion of it extending away from said support, a rigid turret-shaped support having an effective diameter equal to the effective diameter of said annular conveyor support mounted for rotation concentrically therewith in a plane parallel thereto, both of said supports and conveyor being adapted for continuous movement in a horizontal plane, a plurality of molding elements mounted in said turret-shaped support, a plurality of molding elements mounted in said conveyor, the number of the molding elements provided in said conveyor being in excess of the number of molding elements provided in the turret-shaped support, and means for moving the molding elements of the turret-shaped support into the molding elements of the conveyor as the latter are moved on said conveyor support opposite said turret-shaped support.

ALEXANDER P. BARTUSCH.

CERTIFICATE OF CORRECTION.

Patent No. 1,959,894.            May 22, 1934.

ALEXANDER P. BARTUSCH.

It is hereby certified that error appears in the printed specification of the above numbered patent requiring correction as follows: Page 1, line 77, for "wheel" read wheels; page 2, line 103, strike out the word "it"; page 3, line 56, for "support" read supported; and line 122, for "said" read this; page 5, line 85, claim 7, after "about" insert said; and line 86, strike out the words "supported by said first mentioned sprocket wheel" and insert same after "molds" second occurrence, in line 89, of same claim; and that the said Letters Patent should be read with these corrections therein that the same may conform to the record of the case in the Patent Office.

Signed and sealed this 19th day of June, A. D. 1934.

Bryan M. Battey (Seal)                      Acting Commissioner of Patents.

diameter of said annular conveyor support mounted for rotation concentrically therewith in a plane parallel thereto, both of said supports and conveyor being adapted for continuous movement in a horizontal plane, a plurality of molding elements mounted in said turret-shaped support, a plurality of molding elements mounted in said conveyor, the number of the molding elements provided in said conveyor being in excess of the number of molding elements provided in the turret-shaped support, and means for moving the molding elements of the turret-shaped support into the molding elements of the conveyor as the latter are moved on said conveyor support opposite said turret-shaped support.

ALEXANDER P. BARTUSCH.

CERTIFICATE OF CORRECTION.

Patent No. 1,959,894.  May 22, 1934.

ALEXANDER P. BARTUSCH.

It is hereby certified that error appears in the printed specification of the above numbered patent requiring correction as follows: Page 1, line 77, for "wheel" read wheels; page 2, line 103, strike out the word "it"; page 3, line 56, for "support" read supported; and line 122, for "said" read this; page 5, line 85, claim 7, after "about" insert said; and line 86, strike out the words "supported by said first mentioned sprocket wheel" and insert same after "molds" second occurrence, in line 89, of same claim; and that the said Letters Patent should be read with these corrections therein that the same may conform to the record of the case in the Patent Office.

Signed and sealed this 19th day of June, A. D. 1934.

Bryan M. Battey

Acting Commissioner of Patents.

(Seal)